United States Patent [19]

Long

[11] 4,322,003
[45] Mar. 30, 1982

[54] LAMINATE WITH HEAT-SEALABLE POLYESTER FOIL AND PACKAGE

[75] Inventor: Florren E. Long, Mount Vernon, Ohio

[73] Assignee: Ludlow Corporation, Needham Heights, Mass.

[21] Appl. No.: 134,106

[22] Filed: Mar. 26, 1980

[51] Int. Cl.³ ............... B65D 81/02; B32B 15/08
[52] U.S. Cl. ............................ 206/525; 206/0.5; 229/3.5 R; 428/336; 428/344; 428/347; 428/458; 428/480
[58] Field of Search ......... 428/458, 480, 336, 35, 428/344, 346, 347; 206/525, 0.5; 229/3.5 R

[56] References Cited

FOREIGN PATENT DOCUMENTS

| 1027865 | 4/1966 | United Kingdom | 428/458 |
| 1158669 | 7/1969 | United Kingdom | 428/458 |
| 1196537 | 6/1970 | United Kingdom | 428/458 |

Primary Examiner—George F. Lesmes
Assistant Examiner—E. Rollins Buffalow
Attorney, Agent, or Firm—Robert A. Cesari; John F. McKenna; Andrew F. Kehoe

[57] ABSTRACT

An improved flexible package for use in packaging acids, oxidants and the like is constructed with a laminate comprising, at least, an amorphous polyester ply and a metal foil ply. The package is characterized by a superior combination of excellent stability in heatsealing operations over a wide range of conditions and extraordinary chemical resistance to oxidants and acids.

7 Claims, 3 Drawing Figures

LAMINATE WITH HEAT-SEALABLE POLYESTER FOIL AND PACKAGE

BACKGROUND OF THE INVENTION

The invention described herein relates to a heatsealable laminate product and, more particularly, to packages formed of the laminate or containing the laminate as a chemically-resistant barrier material. The package finds particular use in the containment of chemically active ingredients including acidic condiments like mustard, ketchup, horse radish and vinegar; pharmaceuticals containing halogens or acids; cosmetics; and even such materials as the 1% iodine solution known as povidone iodine, i.e. betadine solution. Oxidizing chemicals like halogen-bearing swimming pool-treating materials, e.g. chemicals with as much as 50% available chlorine, are also advantageously packaged according to the invention.

The conventional way to package such chemically active materials is in relatively expensive, inert glass or plastic containers. However, for quite some time, some such materials have been packaged by some suppliers in thin, flexible pouches or envelopes. These envelopes have been formed of laminates, each ply of the laminate contributing some property such as printability, impermeability, heatsealability or a chemical inert character to the package. In fact, all such flexible pouches have been too expensive or too limited in shelf life to be acceptable for many such applications. Perhaps the most pertinent packages known to the art have been those using conventional films of polyvinyl chloride or conventional polyester (for example, the biaxially-oriented crystalline material as sold by DuPont under the trademark MYLAR) laminated to polyethylene.

Indeed, the prior art is replete with more complex attempts to provide improved webs for use in condiment packaging. One of the more successful materials for catsup (but not for mustard or halogen-containing products) has been a web formed of the following plies.
(1) Printed cellophane
(2) White-pigmented (10% titanium dioxide pigment) low-density polyethylene
(3) aluminum foil
(4) urethane adhesive
(5) 0.002 inch layer of medium density polyethylene This is typical of those condiment catsup packages which required a printable surface, a metallic foil barrier and a heatsealable backing ply such as the medium density polyethylene. Also, there is a substantial amount of art which, in effect, details attempts to improve such packages by using special adhesives or adhesive-priming coatings.

Other products which have been used for making heatsealable packaging laminates are aluminum foil/polyester/polyethylene or ionomer laminates, and aluminum foil/polyvinylchloride laminates. The polyester was the non-heatsealable, oriented, or crystalline, material sold by DuPont.

This discussion of the background of the invention is necessarily made with the advantages of the invention in mind. Consequently, it should also be noted that most prior art laminates were either difficult to heatseal or required careful temperature control or both. Substantial improvements in these characteristics would have been welcome in the packaging arts.

SUMMARY OF THE INVENTION

It is the principal object of this invention to provide an improved package of very simple structure which will provide an excellent chemically-resistant laminate and improved flexible packages formed of the laminate.

It is also an object of the invention to provide an improved packaging laminate of the polyester-laminate type which has excellent heatsealability characteristics and chemical resistance.

Other objects of the invention will be obvious to those skilled in the art on their reading of this disclosure.

The above objects have been substantially achieved by the combination, into a laminate structure, of an amorphous, (i.e., non-oriented and non-crystalline) heat-sealable, polyester film. The polyester film used in the invention is not used as a facing or exterior layer but is utilized as a chemically resistant, heatsealable, inner layer. A particular advantage of the film used in manufacturing packages according to the invention is its relatively constant response and stability to heatsealing processes over a wide range of temperatures. Typically, satisfactory heat seals may be achieved with 1-mil films of the amorphous polyester (at an exemplary pressure of 40 lbs. and within an exemplary time of 0.5 seconds) over a range of about 240 to 400 degrees F. or above. Indeed, the seal strength can be maintained in most instances to about ±10% between these temperatures. This feature of the invention allows an extraordinary versatility over a wide range of processing parameters.

The term "amorphous" as used herein means a film which has had no substantial orientation and has had no substantial crystallinity induced in the film. The amorphous polyester film useful in the inventions is conveniently a thin heatsealable film up to 0.004 inches thick which, in a 0.001 inch thickness, is characterized by substantial elongation, usually about 400%, a tear strength of about 40 to 50 psi or more, and a tensile strength of about 5 to 7 lbs. Assembled in the preferred packaging laminates, these properties are largely manifested by the abrasion resistance of the material since the metal foil constrains elongation. Preferred film should have minimum values as follows: elongation 300%; secondary transition temperature—180 degrees F.; tear strength—30 grams.

One material which is commercially available and suitable for forming laminates and packages according to the invention is that polyester film sold under the trade designation Petra by Allied Chemical Co. The more commonly-available biaxially-oriented polyester films (e.g. such materials as those sold under the trade designation Mylar by DuPont) are not suitable for use in the applications described herein.

The material may be used with either a slip additive to aid processing and handling or without such an additive. Moreover, the material can be used and processed either with or without the corona treatments which are used in the plastic-film processing art for enhancing bonding characteristics. However, it is necessary to control such processes carefully because the heatsealable, amorphous characteristics of the polyester film can be substantially deteriorated by excessive corona treatment. Such deterioration is believed to be caused by localized crystallization effects.

If the polyester is laminated onto the foil, it is suggested that the temperature should be kept below 165° F. so to prevent crystalline development and degradation of the sealability of the packages formed of the laminates.

ILLUSTRATIVE EXAMPLE OF THE INVENTION

In this Application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that other skilled in the art will more fully understand the invention and the principles thereof and will be able to modify it and embody it in a variety of forms, each as may be best suited in the condition of a particular case.

IN THE DRAWINGS

Figure 1:
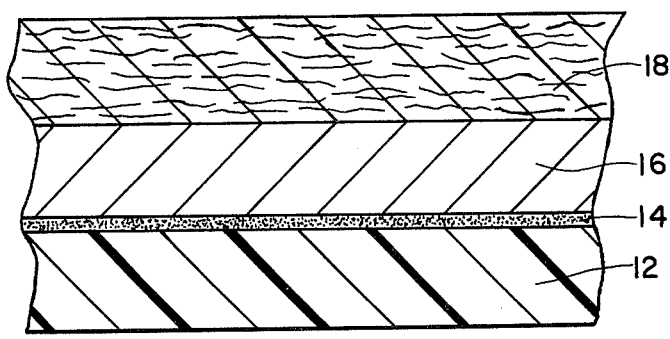
FIG. 1 illustrates, schematically, a section of a laminate formed according to the invention.

Referring to FIG. 1, it is seen that a flexible laminate 10 is formed of a paper member 18 adhesively bonded to aluminum foil 16. In turn, aluminum foil 16 is bonded by a curing adhesive system 14 to an amorphous polyester film 12 of 1 mil. thickness.

Figure 2:
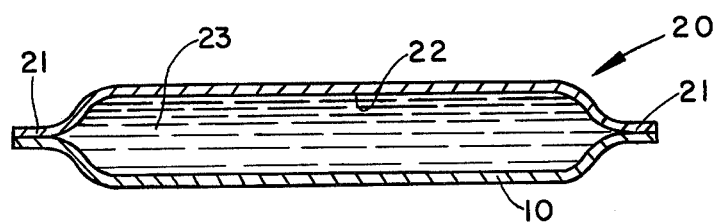
FIG. 2 illustrates a pouch package of the invention.

The film is heatsealed at 21, as seen in FIG. 2, to form a pouch package 20 for acidic condiment 23 with the interior surface 22 formed of the amorphous polyester.

Figure 3:
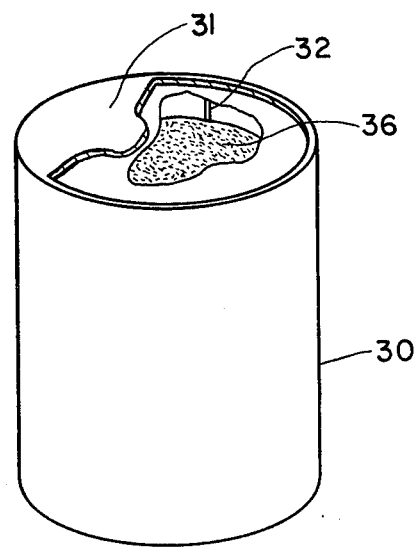
FIG. 3 illustrates a rigid package constructed according to the invention.

FIG. 3 shows a rigid-walled drum package 30 wherein a granular oxidizing chemical such as a chlorine-bearing swimming pool oxidant 36, a material having from 30 to 50% by weight of available chlorine, is carried. Interior surface 31 is formed of the polyester. A completely protective cylindrical wall is completed by formation of a heat-seal seam 32. Optionally, a bag like top can be extended to effect a complete closure.

The excellent corrosion-resistant and storage life characteristics of the packages formed by the invention are evident from a test of the package as it is used to hold a 1% iodine solution of the type known commercially as "betadine" or Povidone iodine.

The pouch tested was formed of (1) 48 gauge polyester of the biaxially-oriented type commonly used in the packaging art (2) 35 gauge aluminum foil and (3) a 1-mil-thick film of amorphous polyester sold commercially under the trade designation Petra Type A. The biaxially-oriented polyester was placed on the matte side of the foil.

In each case, the polyester films were pretreated with a corona process as is known in the art and adhesive-bonded to the foil with a curing-type adhesive system of the type well known in the foil-laminating art. Multi-component systems such as two part polyurethane systems, well known in the art and available from such suppliers as National Starch and Morton Chemicals, are entirely suitable. The adhesive was applied at the rate of one pound of solids per 1000 square feet of polyester film.

The heatsealed test packages contained ½ ounce of iodine solution, were 3½ inches by 4½ inches by ¼ inch in size, and of the BC pouch type. The test was carried out under different sets of controlled conditions: at 75 degrees F. and 50% relative humidity in one case, and at 100 degrees F. and 15% RH in another case. The pouches were examined at 3 weeks, 6 weeks, and 3 months. Examination included inspection for weight change. There was no weight change. Inspection of pouch seal strength was also made. All heat seals remained fused. Strengths of these actually increased somewhat (1 to 12%) but were not embrittled or weakened.

Moreover, the bond between the foil and the amorphous polyester film components of the laminate remained unimpaired over the three-month period. This was true of test portions whether they were selected from the body portion of the pouch (i.e. from a portion of the laminate which is in touch with the packaged iodine solution) or were selected from the heatsealed portions of the package. The above-described test is generally accepted in the art as a way to simulate the accelerated equivalent of a one-year shelf life for the package.

The packages were also submitted to art-recognized mechanical abuse tests intended to simulate the stress imparted to a package in railroad- and truck-transport situations. No problems were encountered with the performance of the package. Other tests showed that cartons of the packages could be dropped five feet or more with no damage to the contents. These drop tests were carried out with cartons of 11 inch×6 1/w inch×9 inch.

ADDITIONAL PACKAGING EXAMPLES

The pouch disclosed above is used to hold all of the materials listed below:
 ketchup (high acetic acid—bearing variety)
 mustard (in acetic acid—bearing vinegar base)
 horse radish (acetic acid—bearing vinegar base)
 vinegar/oil salad dressing All of these packages have shelf lives extending well beyond those currently accepted in commerce for flexible, heat sealed pouches.

It is also to be understood that the following claims are intended to cover all of the generic and specific features of the invention herein described and all statements of the scope of the invention which might be said to fall therebetween. In particular, it is pointed out that the term laminate is to be construed to cover such products as are produced by such processes as coextrusion and extrusion as well as mere bonding of pre-existing plies one to the other.

What is claimed is:

1. A laminate suitable for use in forming corrosion-resistant pouches said laminate comprising a heatsealable surface formed of a heatsealable ply of non-oriented amorphous polyester film and at least one other ply, said other ply being a metal foil bonded to said heatsealable ply.

2. A laminate as defined in claim 1 comprising
   1. a printable exterior ply
   2. an aluminum foil ply and
   3. said polyester ply 3. A laminate as defined in claim 1 wherein said amorphous polyester is about 1 mil. thick, has an elongation of at least 300%, a secondary transition temperature below about 180 degrees F., and a tear strength of at least 30 grams or more.

4. A heatsealed, flexible-wall-type package formed of a laminate as defined in claims 1, 2 or 3 with said heatsealable polyester in contact with the contents of said package.

5. A package comprising a rigid wall construction, said wall comprising a chemically resistant surface formed of a laminate as described in claims 1, 2 or 3, wherein said heatsealable polyester is positioned to contact the contents of said package, and wherein said laminate comprises at least one heatsealed seam within said package.

6. A heatsealed, flexible-wall-type package formed of a laminate as defined in claims 1, 2 or 3 and wherein said heatsealable polyester film is in contact with the contents of said package and wherein said contents contain halogen-bearing oxidizing compounds.

7. A heatsealable, flexible-wall type package formed of a laminate as defined in claims 1, 2 or 3 and wherein said heat-sealable polyester film is in contact with the contents of such package, and wherein said contents are acidic condiments.

* * * * *

UNITED STATES PATENT AND TRADEMARK OFFICE
CERTIFICATE OF CORRECTION

PATENT NO. : 4,322,003
DATED : March 30, 1982
INVENTOR(S) : Florren E. Long

It is certified that error appears in the above-identified patent and that said Letters Patent are hereby corrected as shown below:

Column 4, line 27, delete "1/w" and insert --1/2--.

Signed and Sealed this

Twentieth Day of July 1982

[SEAL]

Attest:

GERALD J. MOSSINGHOFF

Attesting Officer

Commissioner of Patents and Trademarks